US005629374A

United States Patent [19]

Budde et al.

[11] Patent Number: 5,629,374

[45] Date of Patent: May 13, 1997

[54] POST-EXTENDED ANIONIC ACRYLIC DISPERSION

[75] Inventors: Anna M. Budde, Livonia; Timothy D. Salatin, Farmington Hills, both of Mich.

[73] Assignee: BASF Corporation, Southfield, Mich.

[21] Appl. No.: 434,260

[22] Filed: May 3, 1995

Related U.S. Application Data

[62] Division of Ser. No. 676,045, Mar. 27, 1991, abandoned.

[51] Int. Cl.$^{6}$ .......... C08L 37/00

[52] U.S. Cl. .......... 524/549; 524/811

[58] Field of Search .......... 524/549, 811; 523/409, 411

[56] References Cited

U.S. PATENT DOCUMENTS 4,458,040 7/1984 Suzuki et al. .......... 523/409

*Primary Examiner*—Jeffrey T. Smith

*Attorney, Agent, or Firm*—Anne Gerry Sabourin

[57] ABSTRACT

The present invention is directed to an aqueous anionic acrylic dispersion produced by a) dispersing an acrylic resin, having functional groups selected from the group consisting of carboxylic acid groups, carboxylic anhydride groups or mixtures thereof in water in the presence of a tertiary amine and b) reacting the carboxylic acid groups on the acrylic resin with an organic compound having at least two oxirane groups, a basecoat and a rheology control agent comprising said aqueous anionic acrylic dispersion, a method of coating a substrate with said dispersion and the coated substrate.

13 Claims, No Drawings

POST-EXTENDED ANIONIC ACRYLIC DISPERSION

This is a divisional of application Ser. No. 07/676,045 filed on Mar. 27, 1991, now abandoned.

FIELD OF THE INVENTION

The present invention is directed to an aqueous anionic acrylic dispersion as a basecoat for the multilayer coating of an automotive vehicle, more specifically it is directed to an anionic acrylic dispersion post-extended with a compound containing at least two oxirane groups.

BACKGROUND OF THE INVENTION

Multi-layer coating systems were developed to satisfy a need for improved aesthetics of the coated substrate. By applying a relatively thin pigmented layer, termed the "basecoat", and then overcoating with a thicker, unpigmented layer, termed the "clearcoat", it was possible to achieve a glossy coating with an appearance of depth that has commonly been called "the wet look".

Multi-layer systems have been utilized to coat automobiles for a number of years, but the early development of these systems employed organic solvents. As environmental regulations became more stringent organic-borne systems became less desirable. The recent research emphasis in the area of multi-layer systems, especially basecoat systems, has focused on the development of water-borne systems for multi-layer coatings.

In particular, as organic-borne systems were formulated to require less and less organic solvent, becoming known in the industry as "high solids" coatings, it became obvious that the appearance, in particular the metallic effect of coatings containing flake pigments, suffered with the increase in solids. One of the opportunities which water-borne systems presents is that of improving on the metallic effect in a coating which complies with the restrictions on volatile organic content (VOC). Water-borne systems, however, resulted in other problems.

In the past, rheology control agents have been relied on to provide desired application properties such as prevention of sagging, proper edge coverage, proper orientation of metallic flakes used in the coating, and so on. The range of rheology control agents suitable for automotive water-borne coatings is limited. In many cases the rheology control agents which can be used are difficult to disperse or show poor stability. Some rheology control agents which were successfully used in organic-borne coatings have been adapted for use in water-borne coatings, such as the microgels in the invention of Backhouse, U.S. Pat. No. 4,403,003. But these microgels have the deficiencies of being ardorous to make and difficult to stabilize.

The U.S. Pat. No. 4,880,867 discloses an aqueous coating composition comprising a mixture of an acrylic dispersion and a polyurethane dispersion which can be applied by electrostatic spraying. But the acrylic polymer is prepared by solution polymerization at high molecular weights before dispersion. High levels of solvent are required to perform the solution polymerization at reasonable viscosities. In order to obtain a low VOC coating it would be necessary to distill out the organic solvent that is in excess of what is needed for a stable dispersion. It is also necessary to add a commercial thickener to function as the rheology control agent to obtain the desired appearance of the film.

In addition, in a multilayer coating system it is necessary that the basecoat have "strike in" resistance. By "strike in"

resistance is meant the ability of the basecoat to resist attack by the solvents in the topcoat composition. The strike in is a problem because the automobile manufacturers generally wish to apply the topcoat composition in a color plus clear system by a "wet-on-wet" technique. By this is meant that the basecoat composition is applied to the substrate followed by the topcoat composition and then a single baking step is utilized to cure the composite coating. The topcoat "striking in" to the basecoat is particularly undesirable since it adversely affects alignment of the metallic pigment. In highly pigmented colors the non-metallic pigment particles can provide the physical barrier to prevent strike in. But in silver and light metallic colors there is insufficient pigment to prevent strike in. The rheology control agent or a filler pigment must be used to prevent the strike in.

The post-extended anionic acrylic dispersions of the present invention satisfy the needs for rheology control and strike in resistance in a waterborne coating. In particular, they provide excellent metallic flake orientation in a basecoat or one coat topcoat composition. In addition, they overcome the problems of difficulties of dispersion, instability, deleterious presence of emulsion polymerization surfactants, and high volatile organics content encountered with other compositions; as well as the complicated preparation procedures of sterically stabilized dispersions.

The object of the present invention was to provide an aqueous acrylic dispersion in a basecoat which imparts excellent rheology control in an automotive coating system and enhances the metallic appearance of a basecoat with flake pigment. Another object of the present invention was to provide a basecoat comprising this acrylic dispersion. Another object of the present invention was a method of coating a substrate comprising the acrylic dispersion and a substrate coated therewith.

SUMMARY OF THE INVENTION

The objects of the present invention are achieved with an aqueous acrylic dispersion obtainable by a) dispersing an acrylic resin having functional groups selected from the group consisting of carboxylic acid groups, carboxylic anhydride groups or mixtures thereof in water in the presence of a tertiary amine and b) reacting the carboxylic acid groups on the acrylic resin with an organic compound having at least two oxirane groups.

DETAILED DESCRIPTION OF THE INVENTION

Suitable acrylic resins according to the invention comprise:

i) about 1 to 30% by weight of an ethylenically unsaturated carboxylic acid or anhydride or mixtures thereof;

ii) about 20 to 90% other ethylenically unsaturated monomers;

iii) about 0 to 50% by weight of an ethylenically unsaturated monomer with a functional group capable of undergoing crosslinking after the post-extended acrylic dispersion is formed.

Preferred acrylic resins comprise:

i) about 1 to 20% by weight of an ethylenically unsaturated carboxylic acid or anhydride or mixtures thereof;

ii) about 40 to 85% other ethylenically unsaturated monomers;

iii) 2 to 40% by weight of an ethylenically unsaturated monomer with a functional site capable of undergoing crosslinking after the post-extended acrylic dispersion is formed.

Most preferred acrylic resins comprise:

i) about 3 to 15% by weight of an ethylenically unsaturated carboxylic acid or carboxylic anhydride or mixtures thereof;

ii) about 55–85% other ethylenically unsaturated monomers;

iii) 5 to 30% by weight of an ethylenically unsaturated monomer with a functional site capable of undergoing crosslinking after the post-extended acrylic dispersion is formed.

Suitable ethylenically unsaturated carboxylic acid or carboxylic acid anhydride monomers (i) are acrylic acid, methacrylic acid, acryloxy propionic acid or polyacrylic acid mixtures, methacrylic acid dimer or polymethacrylic acid mixtures, crotonic acid, fumaric acid, maleic acid or maleic anhydride, itaconic acid or itaconic anhyrdide, and monoalkyl esters of maleic, itaconic or fumaric acids.

The other ethylenically unsaturated monomers (ii) may be chosen from acrylic or methacrylic alkyl ester derived from alcohols having 1 to about 20 carbon atoms, or vinyl monomers. The expression (meth)acrylate with parenthesis as used herein includes methacrylate and acrylate. Suitable examples are methyl (meth)acrylate, ethyl (meth)acrylate, propyl (meth)acrylate, n-butyl (meth)acrylate, isobutyl (meth)acrylate, tert.-butyl (meth)acrylate and 2-ethylhexyl (meth)acrylate, maleic acid or fumaric acid dialkyl esters in which the alkyl groups have 1 to 20 carbon atoms, vinyl aromatics such as styrene, alpha-methyl styrene, vinyl toluene, tert.-butyl styrene, halogenated vinyl benzenes such as chlorostyrene, and other monomers like vinyl chloride, (meth)acrylamide and (meth)-acrylonitrile.

Examples of ethylenically unsaturated monomers with a functional group capable of undergoing crosslinking after the post-extended acrylic dispersion is formed (iii) are hydroxyethyl acrylate, hydroxyethyl methacrylate, hydroxypropyl acrylate, hydroxypropyl methacrylate, isocyanatoethyl methacrylate, hydroxybutyl acrylate, hydroybutyl methacrylate, propylene glycol monoacrylate, 2,3-dihydroxypropyl methacrylate, pentaerythritol monomethacrylate, polypropylene glycol monoacrylates, and monomethacrylates and meta-isopropenyl- , dimethylbenzyl isocyanate, polyethylene glycol monoacrylates, polyethylene glycol monomethacrylates and glyceryl allyl ether.

Other examples of (iii) are maleic acid and fumaric acid dihydroxyalkyl esters in which the straight chained, branched or cyclic alkyl group contains 2 to 20 carbon atoms. N-hydroxyalkyl (meth)acrylamides and N-hydroxyalkyl fumaric acid mono- or diamides may also be used, e.g., N-hydroxyethyl acrylamide or N-(2-hydroxypropyl) methacrylamide. Other hydroxyl group-containing compounds include allyl alcohol, monovinylethers of polyols, especially diols, such as monovinyl ethers of ethylene glycol and butanediol, and hydroxyl group-containing allyl ethers or esters such as 2,3-dihydroxypropyl monoallyl ether, trimethylolpropane monoallyl ether or 2,3-dihydroxypropanoic acid allyl ester.

Copolymerization is carried out using conventional techniques such as heating the monomers in the presence of a polymerization initiating agent and optionally chain transfer agents. The copolymerization may be carried out in bulk or solution. For the present invention it is preferred to have some solvent present to act as a cosolvent during dispersion. Suitable solvents for solution polymerization are ethylene glycol or propylene glycol and their derivatives, such as dipropylene glycol monomethyl ether and ethylene glycol monobutyl ether acetate; alcohols, such as butyl alcohol and diacetone alcohol; ketones, such as methyl propyl ketone and acetone; esters, such as butyl acetate and pentyl propionate; ethers, such as dioxane and tetrahydrofuran; and other compatible solvents, such as water and N-methyl pyrrolidone; and mixtures thereof. One preferred mixture is ethylene glycol monobutyl ether and water.

Typical initiators are peroxides such as dialkyl peroxides, peroxyesters, peroxydicarbonates, diacyl peroxides, hydroperoxides, and peroxyketals and azo compounds such as 2,2'-azobis(2-methylbutanenitrile) and 1,1'-azobis (cyclohexanecarbonitrile).

Typical chain transfer agents are mercaptans such as octyl mercaptan, n- or tert.-dodecyl mercaptan; halogenated compounds; thiosalicylic acid, mercaptoacetic acid, mercaptoethanol, buten-1-ol, and dimeric alpha-methyl styrene. Mercaptans are preferred.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be between one minute and thirty minutes.

The solvent or solvent mixture is generally heated to the reaction temperature and the monomers and initiator(s) are added at a controlled rate over a period of time, usually between 2 and 6 hours. A chain transfer agent or additional solvent may be fed in also at a controlled rate during this time. The temperature of the mixture is then maintained for a period of time to complete the reaction. Optionally, additional initiator may be added to ensure complete conversion.

The acid number of the acrylic resin is from about 1 to about 230 mg KOH/g, preferably from about 7 to about 156 mg KOH/g, most preferably from about 23 to about 117 mg KOH/g.

The acrylic resin has a weight average molecular weight determined by GPC versus polystyrene standards of from about 4,000 to about 40,000, preferably from about 10,000 to about 25,000. The theoretical Tg of the acrylic resin is from about −30° C. to about 150° C., preferably from about 0° C. to about 50° C. The theoretical Tg may be determined as described by Fox in Bull. Amer. Physics Soc., Vol. 1, No. 2, Page 123 (1956).

Before dispersing the acrylic resin in water it is at least partially neutralized with a tertiary amine or an aminoalcohol. Suitable tertiary amines are, for example, trimethyl amine, triethyl amine, dimethyl aniline, diethyl aniline, N-methyl morpholine and N-ethyl morpholine. Suitable aminoalcohols are dimethyl ethanol amine and triethanol amine. After neutralization, the acrylic resin is diluted with deionized water under agitation to yield a finely divided dispersion.

An organic compound having at least two oxirane groups is added to the acrylic dispersion. Suitable compounds are di- and triglycidyl ether of diols, triols and bisphenols or derivatives of cyclohexene oxides. Examples are diglycidyl ethers of 1,4-butanediol, neopentyl glycols, cyclohexane dimethanols, diethylene glycol, polyethylene glycol, dipropylene glycol, polypropylene glycol, 2,2,4-trimethyl-1,3-pentanediol, 1,6-hexanediol, bisphenol A and resorcinol; and triglycidyl ethers of trimethylol propane, trimethylol ethane and glycerine.

Suitable derivatives of cyclohexane oxides have two or three epoxy groups and are described in a brochure about Cycloaliphatic Epoxide Systems from Union Carbide Chemicals & Plastics Technology Corporation, published Oct. 1989, which is herewith incorporated by reference. The compounds described therein are ERL-4221, ERL-4299, ERL-4234. UCC disclosed another cyclohexene oxide derivative, which is a triepoxide, under the trade name ERLX-4359, which has a molecular weight of 406.46.

Preferred compounds are diglycidyl ethers of 1,4-butanediol, cyclohexane dimethanols, polypropylene glycol, bisphenol A; the triglycidyl ether of trimethylol propane and derivatives of cyclohexane oxides.

The molar ratio of carboxylic groups to epoxide groups is from about 20:1 to 1:1, preferably from about 8:1 to about 1.3:1.

The reaction between the carboxylic acid groups and the oxirane groups is carried to from about 30% to about 100% of the theoretical completion, preferably from about 50% to about 100%, most preferably from about 60% to about 100% of the theoretical completion.

The reaction temperature is not particularly important, but it is preferable to be at about 80° to 100° C. to allow the reaction to proceed with an economy of time.

The aqueous acrylic dispersion described above can be formulated in a water-borne basecoat along with a grind resin, a crosslinking agent, pigments, flake pigments such as aluminum and/or mica particles, basifying agents, water, fillers, surfactants, stabilizers, plasticizers, wetting agents, dispersing agents, adhesion promoters, defoamers, catalysts and optionally, additional polymers or rheology control agents, among other ingredients.

In general, an aqueous acrylic dispersion formulated as described herein, is mixed with a crosslinking agent, water, a portion of an organic solvent, aluminum and/or mica particles, or other pigments which may be dispersed with the aid of a grind resin.

The aqueous acrylic dispersions can be utilized as the principal or major resin. They may also be used in conjunction with another aqueous resin dispersion which is the major resin. In general, the aqueous acrylic dispersion comprises between about 10 and 80% by weight of the total solids present in the basecoat composition.

A compound which functions as a crosslinker or crosslinking agent has two or more functional groups which are reactive with the functional groups on the resin. The crosslinker may be monomeric or polymeric.

For example, the crosslinker can be an acrylic, polyester, alkyd, epoxy or an aminoplast resin or a blocked polyisocyanate or mixtures thereof. Aminoplast resins are aldehyde condensation products of melamine, urea, and similar compounds. Products obtained form the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl- and aryl-substituted ureas and alkyl- and aryl- substituted melamines. Some examples of such compounds are N,N-dimethylurea, benzourea, dicyandiamide, formoguanamine, acetoguanamine, ammeline, 2-chloro-4,6-diamino-1,3,5-triazine, 6-methyl-2,4-diamino-1,3,5-triazine, 3,5-diamino-triazole, triaminopyrimidine, 2-mercapto-4,6-diaminopyrimidine, 2,4,6-triethyltriamino-1,3,5-triazine, and the like.

While the aldehyde employed is most often formaldehyde, other similar condensation products can be made from other aldehydes, for example, acetaldehyde, crotonaldehyde, acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols, as methanol, ethanol, propanol, butanol, pentanol, hexanol, heptanol and others, as well as benzyl- alcohol and other aromatic alcohols, cyclic alcohols for example cylohexanol, monoethers of glycols such as Cellosolves and Carbitols TM (Union Carbide), and halogen-substituted or other substituted alcohols, such as 3-chloropropanol. The preferred amine-aldehyde resins are etherified with methanol or butanol.

A suitable grind resin may be used to incorporate pigments into the basecoat by known methods of producing pigment grind pastes.

Specific examples of the dye stuffs or pigments may be inorganic or organic, for example, graphite, carbon black, zinc chromate, strontium chromate, barium chromate, lead chromate, lead cyanide, titanium dioxide, zinc oxide, iron oxide, cadmium sulfide, iron oxide, aluminum flakes, mica flakes, zinc sulfide, phthalocyanine complexes, naphthol red, carbazole violet, perylene reds, quinacridones and halogenated thioindigo pigments, among others.

The preferred flake pigments are aluminum metal flakes and micas. Preferred micas are those available from the Mearl Corp., New York, N.Y., and EM Chemicals, Hawthorne, N.Y. Preferred aluminum flake pigments are available from Silberline Corp., Lansford, Pa. or from Eckart Werke, Guentersthal, Germany. In a preferred embodiment of the present invention standard grade aluminum stabilized with phosphate ester is used. The flake pigments may also be mixed with non-flake pigments, but these are to be carefully chosen so as not to diminish the desired metallic effect.

The resins used in the basecoat are dispersed in deionized water. It is preferred that the deionized water have conductance readings of less than 13 $microohms^{-1}$ to prevent gassing caused by the reaction of aluminum with water. Deionized water is also chosen to avoid salts that naturally occur in tap water. Other solvents may also be employed with the deionized water. An especially preferred solvent is ethylene glycol monobutyl ether (Butyl Cellosolve TM) which aids mixing, formulating and dispersing pigment in the basecoat. Other solvents can also be used, for example, low-boiling mono- and polyhydric alcohols, ethers, esters, ketones and other organics. The organic solvent, which comprises at most about 80% of the basecoat, and preferably comprises about 10% to 20% by weight of the basecoat including water, may be selected to promote the dispersibility of individual components in the final basecoat and for its low volatility characteristics.

The final basecoat shows excellent rheology control. However, a rheology control agent could be optionally incorporated into the basecoat. Rheology control agents which can be used in embodiments of the present invention include the fumed silica compounds and the bentonite clays. Preferred fumed silica compounds are the hydrophobic silica compounds, for example Aerosil R972, available from DeGussa Corporation, Frankfurt, Germany. Another rheology control agent which may be used, and in certain basecoats, may be preferred is a synthetic sodium lithium magnesium silicate hectorite clay. An example of one such clay is Laponite RD, available from Laporte, Industries, Ltd., Saddlebrook, N.J. In certain preferred embodiments rheology control agents are mixed. The rheology control agent, when it is included, generally comprises about 0.1 to about 20 percent by weight of the basecoat and preferably comprises between about 1 percent and about 5 percent by weight of the final basecoat composition.

The final basecoat is adjusted to a pH of 7.6–7.8 with a tertiary amine, for example, N-ethylmorpholine. Viscosity may be adjusted using deionized water.

The solid content of the final aqueous basecoat is from about 10 to about 60% by weight, preferably from about 15 to about 45 % by weight.

A coated substrate of the present invention comprises at least one coating layer adhered to a substrate. In general, the substrate which is coated can be metal, plastic, wood, ceramic, and so on. Preferably, the substrate is metallic or plastic, and preferably the substrate is an automotive body. The substrate is preferably "precoated" (i.e. coated with primers or any other desired coating which need not incorporate the acrylics of the present invention) before a coating formulation of the present invention is applied thereto.

The basecoat described hereinabove can be applied to the metal or plastic substrate in one or two coats using for example an air atomizer (Binks Model 60 spray gun, available from Binks Manufacturing Corporation, Franklin Park, Ill.), or by using other conventional spraying means. The basecoat may also be applied electrostatically.

After being deposited, the basecoat is flash dried within a temperature range of about room temperature to about 145° F. for between 30 seconds and about 10 minutes using warm air blowing at a relative humidity of 5–40%. The preferred flash temperature is about 120° F. which is carried out for preferably between about 1 and 5 minutes. The flash conditions described herein result in about 90–95% of the solvents including water being flashed from the basecoat in this short period of time.

After the first basecoat is deposited, a second basecoat can be deposited over the first without drying (flash off), or alternatively, a clearcoat may be deposited over the flashed basecoat. Any number of clearcoats known in the art may be used. Any known unpigmented or other transparently pigmented coating agent is in principle, suitable for use as a clearcoat. A typical clearcoat composition contains 30–70% film forming resin and 30–70% volatile organic solvent.

After the clearcoat is coated onto the basecoat layer, the multi-layer coating is then baked to crosslink the polymeric vehicle and to drive the small amount of residual water and organic solvent from the multi-layered coating. A preferred baking step involves heating the coated substrate for a period of 10–60 minutes at a temperature of between 150° and 300° F. The baking step cures the coating to a hard, durable film.

Compositions of the present invention may be used to produce coatings which do not necessarily require the addition of external rheology control agents. Alternatively, the invention may be added at lower levels to a coating composition with a different principal polymer to function as a rheology control agent.

The basic criteria which are considered to be of greatest importance in evaluating the quality of metallic effect in a coating are: (1) the brightness when the coating is viewed at an angle of 90 degrees to the plane of the surface, (2) the brightness of the coating when viewed at oblique angles, and (3) the evenness of the metallic effect (i.e., lack of mottle). Properties (1) and (2) can be measured by goniophotometry. For example, a method has been developed at BASF which uses a Datacolor model GPX-111 goniospectrophotometer. This instrument has a fixed incident light angle of 45°. The detector for the reflection intensity can be varied between 20° and 70° from the specular reflectance angle. It was determined that better metallic effect can be correlated to a greater decrease in the reflected intensity at low angles from specular. A relation was developed which adequately differentiated between observed metallic effects of standard panels. This relation is described by the equation $$C=[(L^*25°-L^*45°)/(L^*45°-L^*70°)]\times 100$$

where L* indicated the light intensity in color space at the angle of measurement.

This measurement is quantitative and reproducible. It will be used in the examples to indicate the degree of metal effect evident in the examples.

EXAMPLE 1

Aqueous Anionic Acrylic Dispersion

The acrylic resin was prepared by loading a reaction flask with 424.0 g ethylene glycol monobutyl ether, 68.0 g deionized water, and 200 g of a mixture of 150.0 g styrene, 295.0 g methyl methacrylate, 295.0 g 2-ethylhexyl acrylate, 200.0 g (1.724eq.) hydroxyethyl acrylate, 60.0 g (0.833eq.) acrylic acid, and 12.0 g t-butyl peroxy-2-ethylhexanoate. The contents of the flask were heated to reflux (100° C.). After a 30 minute hold at reflux, the rest of the monomer mix was added over 2 hours. 27.7 g ethylene glycol monobutyl ether and 7.0 g t-butyl peroxy-2-ethylhexanoate were added and the batch was held at reflux (109° C.) for two hours. The batch was cooled to 70° C. and 47.9 g (0.416eq.) N-ethyl morpholine and 89.0 g deionized water were added. After mixing, 1595.0 g deionized water were added over the period of about 30 minutes. The viscosity was >Z5, the weight non-volatiles (NV)=31.5, and acid number per non-volatile (AN/NV)=47.6 mg KOH/g NV.

The prepared acrylic dispersion was then post-crosslinked by adding 39.2 g (0.223eq.) diglycidyl ether of polypropylene oxide with weight per epoxy (WPE)=170–205 (DER 736, Dow Chemical) and 624.7 g deionized water and heating the mixture to 90° C. This temperature was held for 11 hours, after which the measured AN/NV of 37.2 indicated the epoxy/acid reaction was 80% theoretically complete. The NV were 26.7 and the viscosity was >Z5.

EXAMPLE 2

Aqueous Anionic Acrylic Dispersion

The acrylic resin was prepared by loading a reaction flask with 51 lbs. ethylene glycol monobutyl ether, 8.34 lbs. deionized water, and 24 lbs. of a mixture of 12 lbs. styrene, 24 lbs. 2-ethylhexyl methacrylate, 24 lbs. hydroxyethyl acrylate, 8.71 lbs. (54.83eq.) acrylic acid, 51 lbs. butyl acrylate, and 2.14 lbs. t-butyl peroxy-2-ethylhexanoate. The contents of the flask were heated to reflux (104° C.). After a 30 minute hold at reflux, the rest of the monomer mix was added over 2 hours. 3.35 lbs. ethylene glycol monobutyl ether and 1.05 lbs. t-butyl peroxy-2-ethylhexanoate were added and the batch was held at reflux (110° C.) for two hours. The batch was cooled to 97° C. and 5.89 lbs. N-ethyl morpholine and 11 lbs. deionized water were added. After mixing, 168 lbs. deionized water were added over the period of about 20 minutes. The prepared acrylic dispersion was then post-crosslinked. 4.81 lbs. (13.30eq.) of a diglycidyl ether of Bisphenol A (Epi-Rez 510, Rhone-Poulenc, Performance Resins & Coatings Division) were added and the temperature was maintained at about 88° C. for 7 hours until the reaction was theoretically 83% complete. 125 lbs. deionized water were added to bring the final NV to 25.36. The AN/NV was 44.7.

EXAMPLE 3

Aqueous Anionic Acrylic Dispersion

The acrylic resin was prepared by loading a reaction flask with 423.5 g ethylene glycol monobutyl ether, 69.5 g deionized water, and 200 g of a mixture of 109.1 g styrene, 425.6 g butyl methacrylate, 197.5 g 2-ethylhexyl methacrylate, 197.4 g hydroxyethyl acrylate, 72.6 g acrylic acid, and 17.9 g t-butyl peroxy-2-ethylhexanoate. The contents of the flask were heated to reflux (102° C.). After a 30 minute hold at reflux, the rest of the monomer mix was added over 2 hours. The batch was held at reflux for 0.5 hour. 27.9 g ethylene glycol monobutyl ether and 8.8 g t-butyl peroxy-2-ethylhexanoate were added and the batch was held at reflux (108° C.) for two hours. The batch was cooled to 83° C. and 49.1 g N-ethyl morpholine and 89.8 g deionized water were added. After mixing, 1395.0 g deionized water were added over the period of about 20 minutes. The prepared acrylic dispersion was then post-crosslinked by adding 55.1 g (0.336eq.) Epi-Rez 510 (described above) and heating the mixture to 80° C. The temperature was held for 1.5 hours, after which the measured AN/NV of 46.2 indicated the epoxy/acid reaction was theoretically 40% complete. Deionized water was added to bring the final NV to 25.7.

EXAMPLE 4

Aqueous Anionic Acrylic Dispersion

This resin was prepared according to the formula and directions of Example 3, except that the reaction was allowed to go an additional 4.5 hrs. (total 6 hrs.) to theoretical 70% completion of the crosslinking reaction. Deionized water was added to bring the final NV to 27.6. The AN/NV was 41.0.

EXAMPLE 5

Aqueous Anionic Acrylic Dispersion

The acrylic resin was prepared by loading a reaction flask with 423.5 g ethylene glycol monobutyl ether, 69.5 g deionized water, and 200 g of a mixture of 109.1 g styrene, 425.6 g butyl methacrylate, 197.5 g 2-ethylhexyl methacrylate, 197.4 g hydroxyethyl acrylate, 72.6 g (1.007eq.) acrylic acid, and 17.8 g t-butyl peroxy-2-ethylhexanoate. The contents of the flask were heated to reflux (102° C.). After a 30 minute hold at reflux, the rest of the monomer mix was added over 2 hours. The batch was held at reflux for 0.5 hour. 27.9 g ethylene glycol monobutyl ether and 8.8 g t-butyl peroxy-2-ethylhexanoate were added and the batch was held at reflux (108° C.) for two hours. The batch was cooled to 83° C. and 49.1 g N-ethyl morpholine and 89.8 g deionized water were added. After mixing, 1395.0 g deionized water were added over the period of about 20 minutes. The prepared acrylic dispersion was then post-crosslinked by adding 70.1 g (0.427eq.) Epi-Rez 510 (described above) and heating the mixture to 80° C. The temperature was maintained at about 80° C. for 1.5 hours, after which the measured AN/NV of 44.6 indicated the epoxy/acid reaction was theoretically 36% complete. Deionized water was added to bring the final NV to 26.1.

EXAMPLE 6

Aqueous Anionic Acrylic Dispersion

The resin was prepared according to the formula and directions of Example 5, except that the reaction was allowed to go an additional 4.5 hrs. (total 6 hrs.) to theoretical 75% completion of the crosslinking reaction. Deionized water was added to bring the final NV to 29.9. The AN/NV was 35.9.

EXAMPLE 7

Aqueous Anionic Acrylic Dispersion

Example of an uncrosslinked material, used as a control.

The acrylic dispersion was prepared by loading a reactor with 51 lbs. ethylene glycol monobutyl ether, 8 lbs. deionized water, and 24 lbs. of a mixture of 131 lbs. styrene, 241 lbs. 2-ethylhexyl methacrylate, 24 lbs. hydroxyethyl acrylate, 7.3 lbs. acrylic acid, 52 lbs. butyl acrylate, 2.15 lbs. t-butyl peroxy-2-ethylhexanoate. The contents of the reactor were heated to reflux (102° C.). After a 30 minute hold at reflux, the rest of the monomer mix was added over 2 hours. The batch was held at reflux 0.5 hr. 3.4 lbs. ethylene glycol monobutyl ether and 1.07 lbs. t-butyl peroxy-2-ethylhexanoate were added and the batch was held at reflux (108° C.) for two hours. The batch was cooled to 99° C. and 5.94 lbs. N-ethyl morpholine and 11 lbs. deionized water were added. After mixing, 193 lbs. deionized water were added over the period of about 15 minutes. The final NV was 30.5% and the AN/NV was 46.7.

EXAMPLE 8

Aqueous Anionic Polyurethane Dispersion repared according to Polyurethane Example 1 of U.S. Pat. No. 4,791,168.

A polyester polyol resin was prepared by charging a reaction vessel (flask with a fractionating column) with 551.9 g (15.8% of the polyester resin) of isophthalic acid, 1923 g (54.9%) Empol 1010 (dimer fatty acid available from Emery Group, Henkel Corporation), and 1025.1 g (29.3%) of 1,6-hexanediol and 100 g of toluene. Additional toluene may be added to fill the trap. The mixture was heated under nitrogen and the water of condensation was removed. During this heating 235.7 g of water were distilled off. Heating was continued at approximately 200° C. until the acid number was less than or equal to 8. The remaining toluene was then vacuum stripped at 220° C. to produce a polyester resin for use in the polyurethane resin.

At this point, 697.9 g of the above-synthesized polyester resin 43.0 g of dimethylolpropionic acid, 16.1 g of neopentylglycol, 234.0 grams of isophorone diisocyanate and 300 g of methyl isobutyl ketone were charged to the reactor and heated at reflux (about 128° C.) until a constant isocyanate value was obtained. 36.8 g of trimethylolpropane were then added to the reactor and the batch was allowed to reflux for an additional one hour. At this point, the nitrogen purge was turned off and the batch was cooled to 95° C. 28.6 g of dimethylethanolamine and 100 lbs. of water was then added using a portion of the water as a rinse. The batch was then allowed to sit until it became homogeneous (about 5 minutes) and then 2048.7 g of water was added over a 20 minute period under vigorous agitation.

At the end of this addition the mixture was distilled on high heat with vigorous agitation to remove water and methyl isobutyl ketone. The water was then returned to the batch and the approximately 300 grams of methyl isobutyl ketone which was distilled off were discarded. 238 g of n-butanol were added and the batch was held at 80° C. for 30 minutes. The batch was then dropped and filtered through a 10 micron filter to give a polyester-urethane vehicle for use in the basecoat composition of the invention. The resulting dispersion has a solids content of 30% and a Gardner viscosity of Z2.

EXAMPLE 9

Aqueous Anionic Acrylic Dispersion

The acrylic resin was prepared by loading a reaction flask with 424 g ethylene glycol monobutyl ether, 68 g deionized water, and 200 g of a mixture of 106.7 g styrene, 415.7 g butyl acrylate, 192.7 g 2-ethylhexyl methacrylate, 192.7 g hydroxyethyl acrylate, 93.3 g (1.295eq.) acrylic acid, and 17.0 g t-butyl peroxy-2-ethylhexanoate. The contents of the flask were heated to reflux (102° C.). After a 30 minute hold at reflux, the rest of the monomer mix was added over 2 hours. The batch was held at reflux 0.5hr. 30 g ethylene glycol monobutyl ether and 8.0 g t-butyl peroxy-2-ethylhexanoate were added and the batch was held at reflux (108° C.) for two hours. The batch was cooled to about 90° C. and 74.4 g N-ethyl morpholine and 31.4 g deionized water were added. After mixing, 2003.8 g deionized water were added over the period of about 20 minutes. The prepared acrylic dispersion was then post-crosslinked by adding 106.8 g (0.651eq.) Epi-Rez (described above) and heating the mixture to 85° C. The temperature was maintained at about 85° C. for 8 hours, after which the measured AN/NV of 38.5 indicated the epoxy/acid reaction was theoretically 76% complete. The final NV was 30.0%.

EXAMPLE 10

Aqueous Anionic Acrylic Dispersion

The acrylic resin was prepared by loading a reaction flask with 424 g ethylene glycol monobutyl ether, 70 g deionized water, and 200 g of a mixture of 109 g styrene, 419 g butyl acrylate, 192.8 g 2-ethylhexyl methacrylate, 192.8 g hydroxyethyl acrylate, 73 g (1.013eq.) acrylic acid, 20 g of a polyethylene glycol methacrylate (Sipomer HEM-20, Rhone-Poulenc), and 18.8 g t-butyl peroxy-2-ethylhexanoate. The contents of the flask were heated to reflux (100° C.). After a 30 minute hold at reflux, the rest of the monomer mix was added over 2 hours. The batch was held at reflux 0.5 hr. 30 g ethylene glycol monobutyl ether and 8.0 g t-butyl peroxy-2-ethylhexanoate were added and the batch was held at reflux (105° C.) for two hours. The batch was cooled to about 90° C. and 85.8 g N-ethyl morpholine and 26.1 g deionized water were added. After mixing, 2143.6 g deionized water were added over the period of about 20 minutes. The prepared acrylic dispersion was then post-crosslinked by adding 101.9 g (0.621eq.) Epi-Rez 510 (described above) and heating the mixture to 85° C. The temperature was maintained at about 85° C. for 8 hours, after which the measured AN/NV of 27.5 indicated the epoxy/acid reaction was theoretically 75% complete. The final NV was 27.6%.

Preparation of Basecoats

EXAMPLES 11–17

In these examples the aqueous anionic acrylic dispersion of the present invention was used as the principal resin without any additional rheology control agent.

EXAMPLE 11

36.14 g of the aqueous dispersion from Example 1 were further diluted by adding 35.49 g deionized water with moderate agitation. The pH was adjusted to 8.0–8.3 with 0.80 g N-ethyl morpholine. 2.69 g aminoplast resin (Cymel 327, American Cyanamid, Wayne, N.J.) were added with moderate agitation. An aluminum slurry was prepared by mixing together 3.89 g of an aluminum pigment (Silberline SS-5251 AR, 62% NV), 3.35 g ethylene glycol monobutyl ether and 0.64 g 2-hexyloxyethyl phosphate ester solution (available as Phosphate ester VC3419 from Mobil Chemical Co.) (15% in ethyleneglycolmonobutylether). The basecoat was further reduced to a suitable application viscosity with 17.00 g deionized water.

EXAMPLES 12–17

| Material (WNV) | NV Ratio | 12 | 13 | 14 | 15 | 16 | 17 |
|---|---|---|---|---|---|---|---|
| Mixed together: | | | | | | | |
| Example 2 (25.36) | 14.07 | 554.8 | | | | | |
| Example 3 (25.66) | 14.07 | | 548.3 | | | | |
| Example 5 (26.08) | 14.07 | | | 539.4 | | | |
| Example 4 (27.63) | 14.07 | | | | 509.2 | | |
| Example 6 (29.92) | 14.07 | | | | | 470.2 | |
| Example 7 (30.5) 461.4 | | | | | | | |
| DI Water | | 131 | 126 | 120 | 120 | 120 | 120 |
| N-Ethylmorpholine 5.13 | | 4.7 | 6.0 | 6.0 | 2.1 | 2.0 | |
| Premixed and then added: | | | | | | | |
| Alcoa 7575 Aluminum Flake (64.0) | 3.50 | 54.7 | 54.7 | 54.7 | 54.7 | 54.7 | 54.7 |
| 2-Hexyloxyethyl phosphate ester solution (15% in ethylene glycol monobutyl ether) | 0.02 | 1.5 | 1.5 | 1.5 | 1.5 | 1.5 | 1.5 |
| Ethylene glycol monobutyl ether 54.7 | | 54.7 | 54.7 | 54.7 | 54.7 | 54.7 | |
| Cymel 1158 (American Cyanamid) (80.0) | 3.50 | 43.8 | 43.8 | 43.8 | 43.8 | 43.8 | 43.8 |

Panels were sprayed to a basecoat thickness of 0.5 to 0.7 mils. The panels were flashed for 3 minutes in a forced air oven set at 120° F. and then clear coated and baked for 30 minutes at 250° F. The panels were then judged for metallic effect in C value Reduced with DI water to spray viscosity as measured with a Fisher #2 cup:

| Fisher #2 cup: | I | | | | | | |
|---|---|---|---|---|---|---|---|
| Viscosity | I | 41" | 41" | 38" | 39" | 41" | 39" |
| WNV | I | 17.6 | 22.2 | 23.6 | 20.1 | 26.5 | 22.8 |
| pH | I | 8.08 | 8.04 | 8.17 | 7.85 | 7.89 | 7.81 |

Panels were sprayed to a basecoat thickness of 0.5 mils. The panels were flashed for 3 minutes in a forced air oven set at 120° F. and then clear coated and baked for 30 minutes at 250° F. The panels were then judged for metallic effect in C value.

| C value, goniospectrophotometer | | | | | | | |
|---|---|---|---|---|---|---|---|
| | I | 165 | 180 | 195 | 195 | 165 | * |

*Unacceptable appearance due to strike in

EXAMPLES 18–20

In these examples the aqueous anionic acrylic dispersion of the present invention is used as rheology control additive with another principal resin. Aluminum Slurry: Aluminum Pigment (Silberline SS-5251 AR) (62%NV) 422.0 Ethylene glycol monobutyl ether 358.8 2-Hexyloxyethyl phosphate ester solution (15% in ethylene glycolmonobutyl ether) (15%NV) 78.5

| Ingredient (WNV) | 18 | 19 | 20 |
|---|---|---|---|
| Aluminum Slurry | 111.6 | 111.6 | 111.6 |
| Cymel 327 | 88.8 | 66.6 | 66.6 |
| (American Cyanamid, Wayne, NJ) | | | |
| Mixed and added: | | | |
| Example 8 (26.2%) | 305.4 | 305.4 | 305.4 |
| Example 9 (27.0%) | 133.6 | 200.2 | — |
| Example 10 (27.6%) | — | — | 217.2 |
| Mixed and added: | | | |
| N-Ethylmorpholine (ml) | 2.05 | 3.1 | 1.3 |
| DI Water | 128.3 | 122.5 | 119.1 |
| pH | 7.81 | 7.81 | 7.96 |
| Visc., #2 Fisher | 31" | 34" | 33" |
| Theo. % NV | 31 | 30 | 29 |

Panels were sprayed to a basecoat thickness of 0.5 to 0.7 mils. The panels were flashed for 3 minutes in a forced air oven set at 120° F. and then clear coated and baked for 30 minutes at 250° F. The panels were then judged for metallic effect: C value, goniospectrophotometer 165 165 172

EXAMPLES 21–24

In these examples the invention is used as one of two rheology control additives with another principal resin. Aluminum Slurry (Silberline SS-5251 AR) (62%NV) 422.0 Ethylene glycol monobutyl ether 358.8 2-Hexyloxyethyl phosphate ester solution (15% in ethylene glycol monobutyl ether) (15%NV) 78.5

| Ingredient (WNV) | 21 | 22 | 23 | 24 |
|---|---|---|---|---|
| Aluminum Slurry | 111.6 | 111.6 | 111.6 | 111.6 |
| Cymel 327 (90%) | 72.6 | 83.6 | 80.2 | 72.6 |
| Mixed and added: | | | | |
| Thickener | 272.2 | 90.8 | 181.4 | 272.2 |
| Mixed and Added: | | | | |
| Example 8 (26.2%) | 204.6 | 271.8 | 238.2 | 357.2 |
| Example 9 (27.0%) | 133.6 | 133.6 | 133.6 | — |
| Mixed and added: | | | | |
| N-Ethylmorpholine (ml) | 5.0 | 3.1 | 4.1 | 2.0 |
| DI Water | 186.9 | 157.9 | 188.4 | 193.4 |
| pH | 7.84 | 7.86 | 7.81 | 7.87 |
| Visc., #2 Fisher | 44" | 41" | 38" | 40" |
| Theo. % NV | 28 | 29 | 28 | 27 |

Panels were sprayed to a basecoat thickness of 0.5 to 0.7 mils. The panels were flashed for 3 minutes in a forced air oven set at 120° F. and then clear coated and baked for 30 minutes at 250° F. The panels were then judged for metallic effect in C value.

| | 21 | 22 | 23 | 24 |
|---|---|---|---|---|
| C value, goniospectrophotometer | 180 | 172 | 180 | 172 |

Thickner: Paste of Aerosil R972 (Degussa) hydrophobic fumed silica, sandmilled with appropriate grind resin and melamine in a water/organic solvent mixture. The paste is 9.72% resin, 5.36% melamine, and 11.02% silica.

We claim:

1. A process for producing a basecoat, comprising the steps of:

a) dispersing an acrylic resin having functional groups consisting of carboxylic acid groups, anhydride groups, and mixtures thereof in water in the presence of a tertiary amine to form a dispersion of an acrylic resin having carboxylic acid groups;

b) subsequently reacting the carboxylic acid groups on the acrylic resin with an organic compound with at least two oxirane groups to from about 30% to about 100% of the theoretical completion to form an aqueous anionic acrylic dispersion; and c) adding a crosslinker selected from the group consisting of acrylics, polyesters, alkyds, epoxy resins, aminoplast resins, blocked polyisocyanates, and mixtures thereof.

2. The process of claim 1, wherein the acrylic resin of step a) is produced by a) polymerizing i) about 1 to about 30% by weight of an ethylenically unsaturated carboxylic acid or anhydride or mixtures thereof ii) about 20 to about 90% by weight of other ethylenically unsaturated monomers and iii) about 0 to 50% by weight of an ethylenically unsaturated monomer with a functional group capable of undergoing crosslinking after the post-extended acrylic dispersion is formed, to form an acrylic resin having a functional group consisting of carboxylic acid groups, carboxylic anhydride groups and mixtures thereof.

3. The process of claim 2, wherein the ethylenically unsaturated carboxylic acid or anhydride (i), reacted to form the acrylic resin is selected from the group consisting of acrylic acid, methacrylic acid, acryloxy propionic acid, polyacrylic acid mixtures, methacrylic acid dimer, polymethacrylic acid mixtures, crotonic acid, fumaric acid, maleic acid, itaconic acid, monoalkyl esters of maleic, fumaric, itaconic acid, maleic anhydride, itaconic anhydride and mixtures thereof.

4. The process of claim 2, wherein the ethylenically unsaturated monomer (iii), reacted to form the acrylic resin is selected from the group consisting of hydroxyethyl acrylate, hydroxyethyl methacrylate, hydroxypropyl acrylate, hydroxypropyl methacrylate, isocyanatoethyl methacrylate, hydroxybutyl acrylate, hydroxybutyl methacrylate, meta-isopropenyl,-dimethylbenzyl isocyanate, allyl alcohol, polypropylene glycol monoallyl ether, 2,3-dihydroxypropyl methacrylate, polypropylene glycol mono(meth)acrylate, polyethylene glycol mono (meth)acrylate and mixtures thereof.

5. The process of claim 1, wherein the acrylic resin of step a) has an acid number of 1 to 230 mg KOH/g.

6. The process of claim 1, wherein the acrylic resin of step a) has a weight average molecular weight of from 4,000 to about 40,000.

7. The process of claim 1, wherein the acrylic resin of step a) has a theoretical Tg of from −30° C. to about 150° C.

8. The process of claim 1, wherein the organic compound having at least two oxirane groups reacted in step b), is selected from the group consisting of a diglycidyl ether of a diol, a diglycidyl ether of a bisphenol, a triglycidyl ether of a triol, a derivative of a cyclohexeneoxide and mixtures thereof.

9. The process according to claim 1, wherein the organic compound having at least two oxirane groups reacted in step b) is selected from the group consisting of diglycidyl ethers of 1,4-butanediol, neopentyl glycol, diethylene glycol, polyethylene glycol, propylene glycol, sorbitol, cresol, ethylene glycol, polypropylene glycol, 2,2,4-trimethyl-1,3-pentanediol, 1,6-hexanediol, cyclohexanedimethanol, bisphenol, and resorcinol; triglycidyl ether of trimethylolethane, trimethylolpropane, and glycerin; cyclohexene oxide derivatives with two or more oxirane groups; and mixtures thereof.

10. The process of claim 1, wherein the organic compound having at least two oxirane groups reacted in step b) is an oligomer or polymer.

11. The process of claim 1, wherein the carboxylic acid groups on the acrylic of step a) and the oxirane groups on the organic compound of step b) are reacted in a molar ratio of from about 20:1 to about 1:1.

12. The process of claim 1, wherein the reaction between the carboxylic acid groups and the oxirane groups is from about 30 percent to about 100 percent complete.

13. A process according to claim 1, wherein a flake pigment is added after step c).

* * * * *